Patented June 14, 1932

1,862,592

UNITED STATES PATENT OFFICE

ERICH GOTH, OF ELBERFELD, GERMANY, ASSIGNOR TO I. G. FARBENINDUSTRIE AKTIEN-GESELLSCHAFT, OF FRANKFORT-ON-THE-MAIN, GERMANY

MANUFACTURING VISCOSE

No Drawing. Application filed October 9, 1930, Serial No. 487,636, and in Germany October 16, 1929.

My present invention relates to a new process of manufacturing viscose solutions as used in the manufacture of artificial silk. One of its objects is to provide viscose solutions the viscosity of which is much lower than the viscosities of viscose solutions made according to the usual processes and under otherwise like conditions.

Another object of my invention is to considerably reduce the ripening time of the cellulose xanthogenate or when maintaining the same ripening time to greatly increase the cellulose content of the final viscose solution. Additional objects of my invention are the new viscose solutions having a peculiar low viscosity with respect to their cellulose content. Further objects of my invention will be seen from the detailed specification following hereafter.

My invention is based on the observation that viscose solutions of especially low viscosity are obtainable when performing the xanthogenation of the alkali cellulose in the presence of a soluble sulfide. In order to obtain the desired effect, a soluble sulfide may be added to the sodium hydroxide solution used in preparing the alkali metal cellulose, or it may be added to the pressed alkali metal cellulose before or during disintegrating the latter or, finally, before or during xanthogenizing the alkali metal cellulose.

The quantities of soluble sulfide I add, may vary within wide limits. About 0.5 per cent of sodium sulfide calculated on the quantity of cellulose used, are already efficacious. This quantity may be raised up to about 10 per cent. The other conditions during the reaction, such as temperature, are as usual in the well known processes of manufacturing cellulose xanthogenate.

The following examples serve to illustrate my invention, the parts being by weight:—

*Example 1.*—100 parts of cellulose containing about 94 per cent of α-cellulose (calculated on the dry starting material) are steeped for 2 hours in a solution containing 15.2 per cent of sodium hydroxide and 2.68 per cent of sodium sulfide. The alkali metal cellulose thus obtained, is pressed as usual to 300 parts by weight and the residue comminuted in a suitable apparatus, for instance, in a shredder. The comminuted soda cellulose is then kept at 20° C. for about 22 hours. Thereupon it is treated, for example, in a sulfidizing drum with 32 parts of carbon disulfide. The xanthogenate thus obtained is then dissolved in caustic soda and in water to form a viscose solution showing an analysis 7.5 per cent of cellulose and 6.5 per cent of alkali. The finished viscose shows in the ball viscosimeter a viscosity of 11 seconds, while a viscose prepared from the same cellulose with use of a mercerizing solution of the same total alkali content of about 17.8 per cent not containing, however, a sulfide, has a viscosity of 330 seconds. The viscosity is determined in both cases by measuring in seconds the time in which a polished steel ball of about 3 mm. diameter falls through a column of 20 cm. height of the viscose, freed from air bubbles and kept at 20° C.

*Example 2.*—100 parts of a cellulose are mercerized with a solution containing 13.25 per cent of sodium hydroxide and 4.3 per cent of sodium sulfide. Then the mass is pressed to 300 parts and kept at room temperature for about 24 hours. After comminution, the pressed mass is xanthogenized in a sulfidizing drum with 32 parts of carbon disulfide and dissolved in caustic soda and water to a solution containing 14 per cent of cellulose and 7.5 per cent of sodium hydroxide. The viscosity of the viscose solution thus obtained, is not higher than that of a viscose solution obtained from a mercerizing bath free from sulfide, and containing, however, only 7 per cent of cellulose.

*Example 3.*—100 parts of cellulose are steeped in a solution containing 17.8 per cent of sodium hydroxide and pressed after complete impregnation to 280 parts. The pressed mass is comminuted in a suitable apparatus and during comminution spread with a solution of 3 parts of sodium sulfide dissolved in 20 parts of water. This comminution is carried out during 2 hours and then the alkali cellulose is xanthogenized without ripening by means of 32 parts of carbon disulfide. The xanthogenate is dissolved in water and caustic soda to a viscose solution containing 7.5 per cent of cellulose and 6.5 per cent of alkali. The solution shows a viscosity of 81 seconds measured in the ball viscosimeter.

A viscose solution obtained from the same starting material and under the same working conditions omitting, however, the treatment with sodium sulfide, shows a viscosity of 333 seconds.

My present invention is not limited to the foregoing examples or to the specific details given therein. I may use, for instance, as starting materials all types of cellulose as generally used in industry for the manufacture of artificial silk.

Instead of sodium sulfide or sodium disulfide I may use the corresponding potassium or ammonium compounds.

What I claim is:—

1. The process which comprises xanthogenizing an alkali metal cellulose with carbon disulfide in the presence of an alkali metal sulfide.

2. The process which comprises xanthogenizing an alkali metal cellulose with carbon disulfide in the presence of a substance selected from the group consisting of alkali metal sulfides and ammonium sulfide in amount ranging from about 0.5 to at most 10 per cent calculated on the weight of the cellulose used.

3. The process which comprises treating cellulose with alkali metal hydroxide in excess containing alkali metal sulfide, pressing the alkali metal cellulose formed, comminuting the latter and treating it with carbon disulfide.

4. The process which comprises treating cellulose with alkali metal hydroxide in excess containing alkali metal sulfide, pressing the alkali metal cellulose formed, comminuting the latter and allowing it to mature and finally treating it with carbon disulfide.

5. The process which comprises xanthogenizing an alkali metal cellulose with carbon disulfide in the presence of a sulfide selected from the group consisting of alkali metal sulfides and ammonium sulfide.

6. The process which comprises treating 100 parts of cellulose containing 94 per cent of $\alpha$-cellulose with a solution containing 15.2 per cent. of sodium hydroxide and 2.68 per cent. of sodium sulfide, pressing the alkali metal cellulose formed, comminuting the latter and allowing it to mature and finally treating it with carbon disulfide.

7. The process which comprises treating 100 parts of cellulose with a solution containing 13.25 per cent. of sodium hydroxide and 4.3 per cent. of sodium sulfide, pressing the alkali metal cellulose formed, comminuting the latter and allowing it to mature and finally treating it with carbon disulfide.

8. The process which comprises treating 100 parts of cellulose with a solution containing 17.8 per cent. of sodium hydroxide, pressing the alkali metal cellulose formed, comminuting the latter and spraying it with a solution containing 20 parts by weight of water and 3 parts by weight of sodium sulfide, and treating the resulting mass with carbon disulfide.

In testimony whereof, I affix my signature.

ERICH GOTH.